United States Patent
Mizoguchi

(10) Patent No.: US 12,024,246 B2
(45) Date of Patent: Jul. 2, 2024

(54) VEHICLE DRIVE ASSIST APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 357 days.

(21) Appl. No.: 17/575,044

(22) Filed: Jan. 13, 2022

(65) Prior Publication Data

US 2022/0242481 A1 Aug. 4, 2022

(30) Foreign Application Priority Data

Feb. 2, 2021 (JP) .................................. 2021-015142

(51) Int. Cl.
*B62D 6/00* (2006.01)
*B62D 15/02* (2006.01)

(52) U.S. Cl.
CPC ........... *B62D 6/003* (2013.01); *B62D 15/025* (2013.01)

(58) Field of Classification Search
CPC ............................. B62D 6/003; B62D 15/025
See application file for complete search history.

(56) References Cited

U.S. PATENT DOCUMENTS 10,065,639 B2 * 9/2018 Taniguchi ............ B62D 15/025

FOREIGN PATENT DOCUMENTS

JP 2019-038395 A 3/2019

* cited by examiner

*Primary Examiner* — Jason Holloway
*Assistant Examiner* — Christopher A Buksa
(74) *Attorney, Agent, or Firm* — Rimon PC

(57) ABSTRACT

A vehicle drive assist apparatus for a vehicle includes a target yaw rate calculation unit that sets a target yaw rate to cause the vehicle to travel along a horizontal curve; a reference steering wheel angle calculation unit that sets a reference steering wheel angle; a feedforward target steering wheel angle calculation unit that sets a feedforward target steering wheel angle; an estimated yaw rate calculation unit that sets an estimated yaw rate based on a lateral force component exerted on the vehicle traveling on the curve; and a feedforward correction gain calculation unit that sets a feedforward correction gain based on the ratio between the target yaw rate and the estimated yaw rate. The feedforward target steering wheel angle calculation unit sets the feedforward target steering wheel angle in consideration of the lateral force component by correcting the reference steering wheel angle with the feedforward correction gain.

7 Claims, 4 Drawing Sheets

VEHICLE DRIVE ASSIST APPARATUS

CROSS-REFERENCE TO RELATED APPLICATIONS

The present application claims priority from Japanese Patent Application No. 2021-015142 filed on Feb. 2, 2021, the entire contents of which are hereby incorporated by reference.

BACKGROUND

The technology relates to a vehicle drive assist apparatus that corrects a feedforward steering wheel angle set for traveling on a horizontal road surface to a value determined in consideration of a lateral force component when an own vehicle travels on a curved road under automatic steering control.

Recent vehicles have various drive assist functions that reduce driving loads on a driver to improve driving comfort. One of the drive assist functions is automatic steering control. As the automatic steering control, active lane keep (ALK) control has been known that recognizes the shape of the road located in front of an own vehicle using a front environment recognition sensor such as a stereo camera, and controls the own vehicle to travel along the middle of the traveling lane.

Another automatic steering control for automatic driving has been known that acquires position information (or position coordinates) of the own vehicle on the basis of positioning signals received from the satellites of the global navigation satellites system (GNSS), such as the GPS satellites, performs map matching of the position of the own vehicle on a high-definition road map (or a dynamic map) to retrieve the shape of the road located in front of the own vehicle from the road map, and perform steering control to cause the own vehicle to travel along the middle of the traveling lane on the road map.

For example, Japanese Unexamined Patent Application Publication No. 2019-38395 discloses a technique for setting a feedforward (FF) target steering wheel angle on the basis of an own vehicle speed, a road curvature, and a vehicle model acquired through modeling of a behavior of the own vehicle (e.g., a two-wheel model). In this technique, the yaw angle of the own vehicle with respect to the road curvature (i.e., the yaw angle with respect to the lane) is calculated, and a feedback (FB) target steering wheel angle is set such that the yaw angle with respect to the lane becomes 0 (zero). Thereafter, the FB target steering wheel angle is added to the FF target steering wheel angle to calculate an instruction steering wheel angle, and a steering operation is performed on the basis of the instruction steering wheel angle.

SUMMARY

An aspect of the technology provides a vehicle drive assist apparatus to be applied to a vehicle. The vehicle drive assist apparatus includes a target yaw rate calculation unit, a reference steering wheel angle calculation unit, a feedforward target steering wheel angle calculation unit, an estimated yaw rate calculation unit, and a feedforward correction gain calculation unit. The target yaw rate calculation unit is configured to set a target yaw rate on the basis of a road curvature of a target traveling course set in front of the vehicle and a vehicle speed of the vehicle. The target yaw rate is set to cause the vehicle to travel along a horizontal curved road. The reference steering wheel angle calculation unit is configured to set a reference steering wheel angle for a steering wheel of the vehicle on the basis of the target yaw rate set by the target yaw rate calculation unit and the vehicle speed. The feedforward target steering wheel angle calculation unit is configured to set a feedforward target steering wheel angle on the basis of the reference steering wheel angle set by the reference steering wheel angle calculation unit. The estimated yaw rate calculation unit is configured to calculate a lateral force component exerted on the vehicle traveling on a curved road on the basis of the vehicle speed, an actual yaw rate detected by a yaw rate sensor, and a lateral acceleration rate, and set an estimated yaw rate on the basis of the lateral force component and the target yaw rate set by the target yaw rate calculation unit. The feedforward correction gain calculation unit is configured to set a feedforward correction gain on the basis of a ratio between the target yaw rate set by the target yaw rate calculation unit and the estimated yaw rate set by the estimated yaw rate calculation unit. The feedforward target steering wheel angle calculation unit is configured to set the feedforward target steering wheel angle in consideration of the lateral force component by correcting the reference steering wheel angle set by the reference steering wheel angle calculation unit with the feedforward correction gain set by the feedforward correction gain calculation unit.

An aspect of the technology provides a vehicle drive assist apparatus to be applied to a vehicle. The vehicle drive assist apparatus includes circuitry. The circuitry is configured to set, on the basis of a road curvature of a target traveling course set in front of the vehicle and an vehicle speed, a target yaw rate set to cause the vehicle to travel along a horizontal curved road. The circuitry is configured to set a reference steering wheel angle for a steering wheel of the vehicle on the basis of the target yaw rate and the vehicle speed; set a feedforward target steering wheel angle on the basis of the reference steering wheel angle. The circuitry is configured to calculate a lateral force component exerted on the vehicle traveling on a curved road on the basis of the vehicle speed, an actual yaw rate detected by a yaw rate sensor, and a lateral acceleration rate. The circuitry is configured to set an estimated yaw rate on the basis of the lateral force component and the target yaw rate. The circuitry is configured to set a feedforward correction gain on the basis of a ratio between the target yaw rate and the estimated yaw rate. The circuitry is configured to set the feedforward target steering wheel angle in consideration of the lateral force component by correcting the reference steering wheel angle with the feedforward correction gain.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 5:
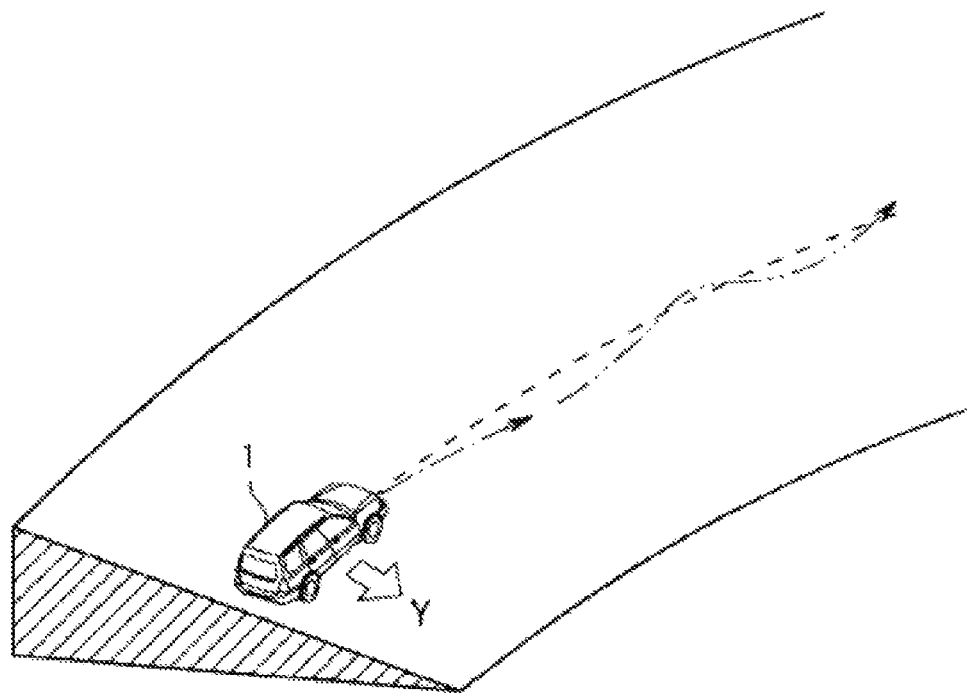
FIG. 5 is an explanatory diagram illustrating an exemplary situation where a lateral force disturbance is exerted to an own vehicle traveling on a curved road having a road surface with a transverse gradient.

While an own vehicle is traveling on a curved road having a horizontal road surface and being free from influence of a disturbance under drive assist control using the ALK control function, the FB steering wheel angle becomes substantially zero, and the FF target steering wheel angle is substantially equal to the instruction steering wheel angle. Thus, the own vehicle is controlled to travel along the middle of the lane (indicated by a broken line in FIG. 5) at the instruction steering wheel angle (or the FF target steering wheel angle) determined on the basis of the road curvature. For example, when the transverse gradient of the road surface (also referred to as a road surface cant) or a lateral force disturbance, such as a crosswind, is applied to the own vehicle in a centripetal direction of the curved road, the own vehicle experiences a drift phenomenon in which the own vehicle is moved in an inward direction of the curved road, as indicated by a dashed-dotted line in FIG. 5. The drift phenomenon, however, is corrected with the FB target steering wheel angle, so that the own vehicle is returned to the middle of the lane.

Unfortunately, if this feedback control to compensate the drift phenomenon is constantly executed in the automatic steering control, the loads on the feedback control system increases, which can result in a control delay. For example, the own vehicle is likely to wobble as indicated by a dashed-two dotted line in FIG. 5, which can impair running stability.

It is desirable to provide a vehicle drive assist apparatus that exhibits excellent running stability by reducing the occurrence of a drift phenomenon due to a lateral force disturbance and reducing the loads on the feedback control system to suppress a control delay while the vehicle is traveling on a curved road under automatic steering control.

In the following, some example embodiments of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 1:
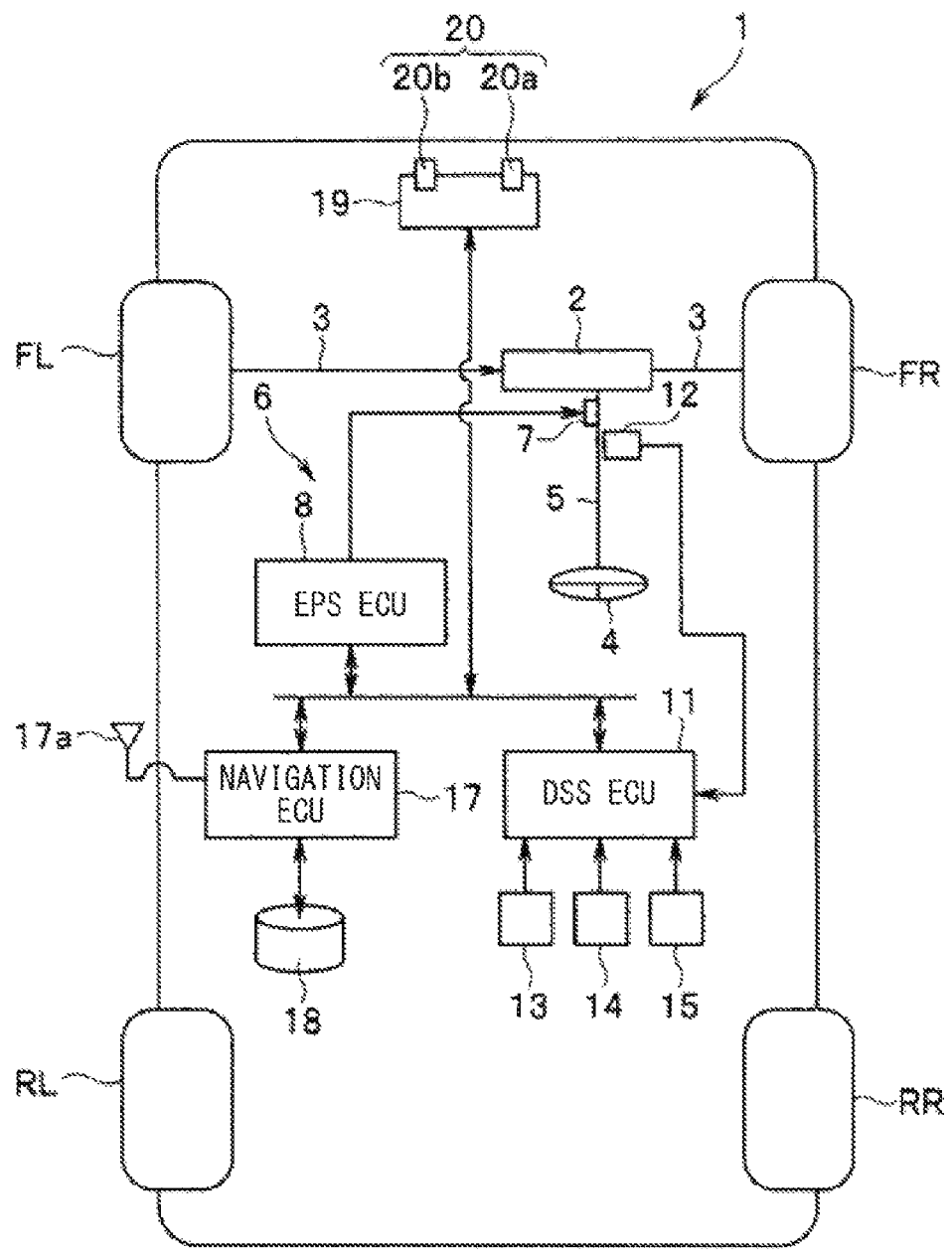
FIG. 1 is a diagram schematically illustrating an exemplary configuration of a drive assist apparatus according to one example embodiment of the technology.

As illustrated in FIG. 1, an own vehicle 1 may have a left front wheel FL, a right front wheel FR, a left rear wheel RL, and a right rear wheel RR. The left front wheel FL and the right front wheel FR may be drive wheels coupled to a steering mechanism 2 via respective tie rods 3. The steering mechanism 2 may be a rack and pinion mechanism, for example. To the steering mechanism 2, a steering shaft 5 may be coupled. The steering shaft 5 may have a leading end to which a steering wheel 4 is fixed. When a driver operates the steering wheel 4, the left front wheel FL and the right front wheel FR may be driven by the steering mechanism 2.

To the steering shaft 5, an electric power steering (EPS) motor 7 of an EPS device 6 may be coupled via a non-illustrated transfer mechanism. The EPS device 6 may include the EPS motor 7 and an EPS ECU 8. The EPS ECU 8 may control an assist torque applied from the EPS motor 7 to the steering shaft 5.

The EPS ECU 8 may be coupled to a driving support system (DSS) ECU 11 and a navigation ECU 17 to be described later via an in-vehicle network such as a controller area network (CAN) in a mutually communicable manner.

While the DSS ECU 11 is activated, the EPS ECU 8 may set an EPS torque corresponding to an instruction steering wheel angle set by the DSS ECU 11. Thereafter, the EPS ECU 8 may drive the EPS motor 7 with the EPS torque, and perform steering control to cause the own vehicle 1 to travel along a target traveling course set in front of the own vehicle 1 to guide the own vehicle 1. The target traveling course may be set on the middle of the lane, in general. While the DSS ECU 11 is not activated, that is, while the own vehicle 1 is caused to travel in accordance with a steering wheel operation performed by the driver, the EPS ECU 8 may set an assist torque that assists the steering torque applied by the driver to the steering wheel 4.

To the DSS ECU 11, various parameters necessary to perform the automatic steering control may be inputted. The parameters may be signals outputted from sensors that detect behaviors exerted on the own vehicle 1, such as a steering wheel angle sensor 12, a yaw rate sensor 13, a vehicle speed sensor 14, a lateral acceleration sensor 15. The steering wheel angle sensor 12 may be coupled to the steering shaft 5 to detect a steering wheel angle θh of the steering wheel 4. The yaw rate sensor 13 may detect an actual yaw rate γreal exerted on the own vehicle 1. The vehicle speed sensor 14 may detect an own vehicle speed V of the own vehicle 1. The lateral acceleration sensor 15 may detect an acceleration rate Ax exerted on the own vehicle 1 in a lateral direction (hereinafter referred to as a lateral acceleration rate Ax). Additionally, the DSS ECU 11 may read the curvature 1/R of the target traveling course (e.g., the middle of the lane) detected in front of the own vehicle 1 by the navigation ECU 17.

The navigation ECU 17 may include a positioning radio wave receiver. The navigation ECU 17 may sequentially acquire positions (position coordinates) of the own vehicle 1 on the basis of the position information transmitted from the GNSS positioning satellites to a receiving antenna 17a. To the navigation ECU 17, a road map database 18 storing a high-definition road map (or a dynamic map) may be coupled. The road map database 18 may be provided in a mass storage medium such as a hard disk. The high-definition road map data stored in the road map database 18 may have a configuration in which dynamic information is superimposed on static map data. The static map data may include data on the shapes of roads and structures, and data on lanes, for example. The dynamic information may include data that dynamically changes, such as data on traffic regulations, accidents, traffic congestions, vehicles, pedestrians, traffic lights, and so forth for each road. The dynamic information may be updated in response to changes in the surrounding environment.

The static map data may include road map data stored in each node set at a predetermined interval along the middle of the lane width. The road map data may include data on the position (latitude, longitude, and altitude) of a road and data on the shape of the road (e.g., data as to whether the road is curved or straight, and data on the radius of curvature of the curved road).

In addition to the EPS ECU 8 and the DSS ECU 11, non-illustrated other control units that control the traveling state of the own vehicle 1 traveling under the automatic driving control may be coupled to the in-vehicle network described above in a mutually communicable manner. For example, a drive source control unit that controls drive sources such as an engine and an electric motor, a transmission control unit, and a vehicle dynamics control (VDC) device that performs vehicle dynamics control including brake control may be connected to the in-vehicle network. These control units may be each a microcomputer that includes a CPU, a ROM, a RAM, and peripheral devices, for example. The ROM may store programs to be executed by the CPU and fixed data such as data map.

The own vehicle 1 may include a front environment recognition device 19 that acquires traveling environment information. The traveling environment information may be information on an external environment recognized in front of the own vehicle 1. The front environment recognition device 19 may also be mainly configured by a microcomputer, and includes an in-vehicle camera 20. The in-vehicle camera 20 may be a stereo camera including a main camera 20a and a sub-camera 20b.

The front environment recognition device 19 may perform image processing on the image of the front traveling environment captured by the in-vehicle camera 20 to generate image data necessary to perform the automatic steering control such as the ALK control. In the ALK control, the left and right lane dividing lines of the traveling lane may be recognized to cause the own vehicle 1 to travel along the middle of the traveling lane, for example. Note that the front environment recognition device 19 may be any device that acquires the front traveling environment information such as the lane dividing lines. For example, the front environment recognition device 19 may be a millimeter-wave radar, an ultrasonic radar, or a light detection and ranging radar (LiDAR), instead of the stereo camera. Alternatively, the front environment recognition device 19 may be a combination of these radars and a monocular camera.

The DSS ECU 11 may read the position information of the own vehicle 1 acquired by the navigation ECU 17 and perform steering control to cause the own vehicle 1 to travel along the traveling lane in some or all sections of a guide course to the destination set on the road map. Additionally, the DSS ECU 11 may recognize the left and right lane dividing lines of the traveling lane on the basis of the traveling environment information received from the front environment recognition device 19, and perform the ALK control to cause the own vehicle 1 to travel along the middle of the traveling lane. When the own vehicle 1 travels on a curved road, the DSS ECU 11 may calculate the road curvature of the target traveling course (e.g., the middle of the lane) set on the curved road on the basis of the road map data or the traveling environment information received from the front environment recognition device 19.

If the curved road has a road surface with a transverse gradient (i.e., road cant) or if a crosswind is generated in the inward direction of the curved road, the road cant or the crosswind can serve as a lateral force disturbance, causing the drift phenomenon in which the own vehicle 1 is moved in the inward direction of the curved road. To address such a concern, the DSS ECU 11 reduces the loads on the control responsiveness and the feedback control system by compensating the lateral force component exerted on the own vehicle 1 through the feedforward control.

Figure 2:
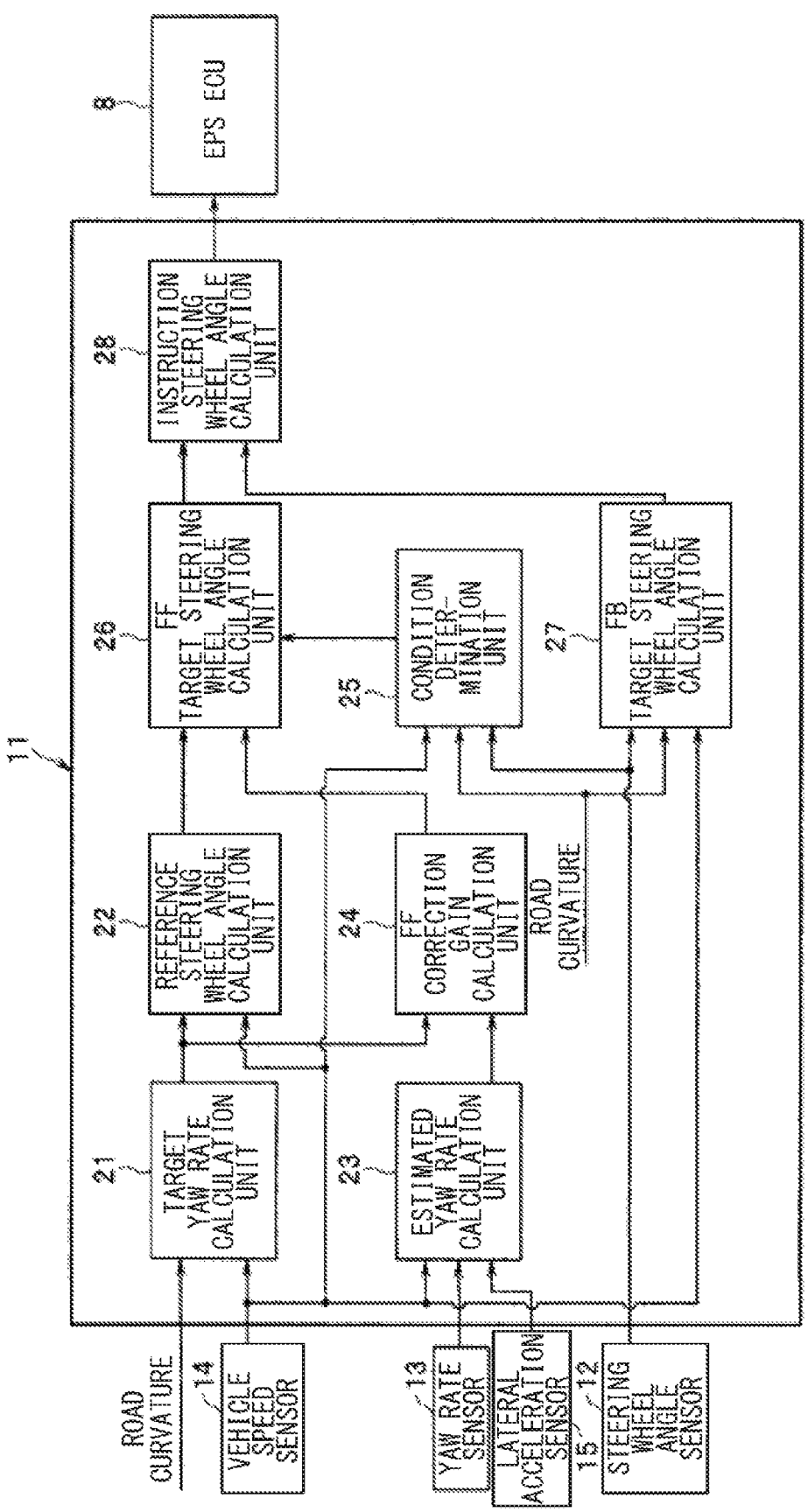
FIG. 2 is a block diagram illustrating an exemplary configuration of a DDS ECU in the drive assist apparatus.

To execute the automatic steering control, the DSS ECU 11 includes a target yaw rate calculation unit 21, a reference steering wheel angle calculation unit 22, an estimated yaw rate calculation unit 23, a feedforward (FF) correction gain calculation unit 24, a condition determination unit 25, a FF target steering wheel angle calculation unit 26, a feedback (FB) target steering wheel angle calculation unit 27, and an instruction steering wheel angle calculation unit 28, as illustrated in FIG. 2.

Exemplary operations of these units of the DDS ECU 11 illustrated in FIG. 2 will now be described.

Figure 3:
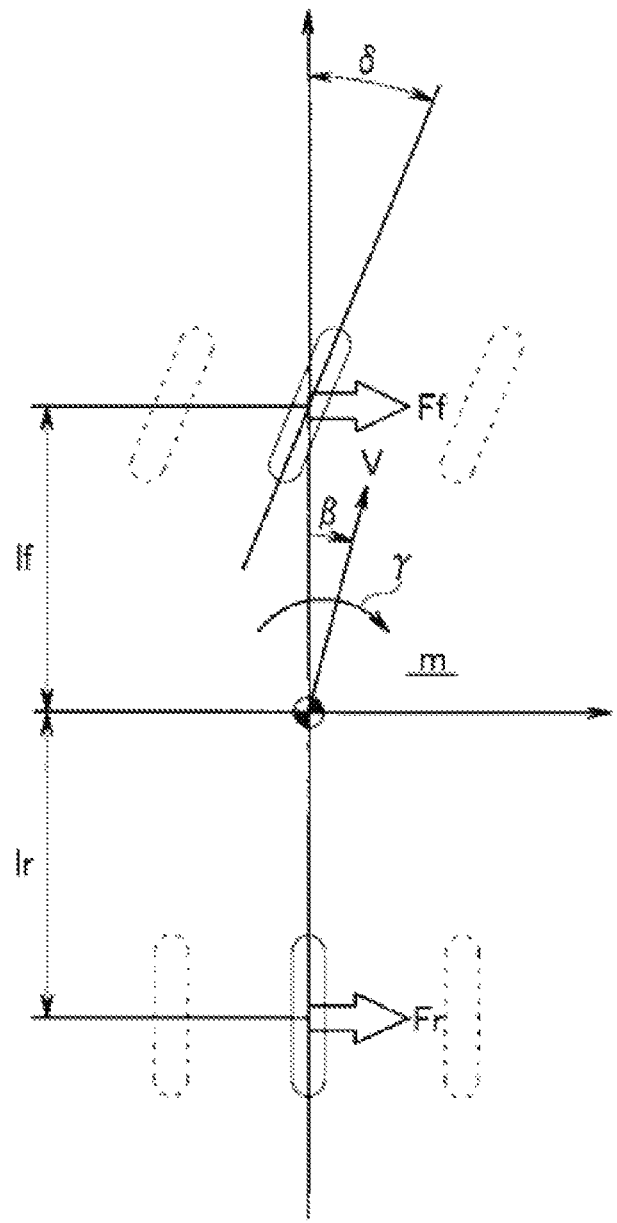
FIG. 3 is an explanatory diagram illustrating an exemplary two-wheel model.

The target yaw rate calculation unit 21 may calculate a target yaw rate γtgt using a two-wheel model expression, which is a representative example of a vehicle model expression illustrated in FIG. 3, on the basis of the own vehicle speed V detected by the vehicle speed sensor 14 and the road curvature 1/R of the target traveling course (e.g., the middle of the lane) detected in front of the own vehicle 1 by the navigation ECU 17 or the front environment recognition device 19. The target yaw rate γtgt may be used when the own vehicle 1 travels on a horizontal curved road. The target yaw rate γtgt may be a target yaw rate set for traveling on a horizontal curved road.

In FIG. 3, "lf" denotes the distance from the center of gravity of a front wheel to a front wheel shaft, "lr" denotes the distance from the center of gravity of a rear wheel to a rear wheel shaft, "m" denotes the mass of the vehicle body, "V" denotes an own vehicle speed, "Ff" denotes a cornering force of the front wheel, "Fr" denotes a cornering force of the rear wheel, "γ" denotes a yaw rate, "β" denotes a sideslip angle of the vehicle body, and "δ" denotes a steering angle. The steering angle δ may be determined by an expression, δ=θh/N, where "θh" denotes a rotation angle of the steering shaft 5 (i.e., a steering wheel angle), and "N" denotes a steering gear ratio. The steering gear ratio N may be a fixed value. Thus, the steering angle δ may be calculated from the steering wheel angle θh without exception.

The cornering force Ff of the front wheel and the cornering force Fr of the rear wheel may satisfy the following expression:

$$Ff=-2Kf\beta f Fr=-2Kr\beta f$$

where "βf" denotes the sideslip angle of the front wheel, "βr" denotes the sideslip angle of the rear wheel, "Kf" denotes a tire cornering power per front wheel, and "Kr" denotes the tire cornering power per rear wheel.

The two-wheel model expression may consist of the following expressions:

$$mV\frac{d}{dt}\beta + 2(K_f + K_r)\beta + \left\{mV + \frac{2}{V}(l_f K_f - l_r K_r)\right\}\gamma = 2K_f\delta \quad \text{Expression 1}$$

$$2(l_f K_f - l_r K_r)\beta + I\frac{d}{dt}\gamma + \frac{2(l_f^2 K_f + l_r^2 K_r)}{V}\gamma = 2l_f K_f\delta \quad \text{Expression 2}$$

where "γ" denotes the target yaw rate γtgt, and "I" denotes a yaw moment of inertia. The target yaw rate calculation unit 21 may substitute the steering angle δ determined on the basis of the own vehicle speed V and the road curvature 1/R into Expressions 1 and 2, and solve the system of equations to calculate the target yaw rate γtgt.

The target yaw rate γtgt calculated by the target yaw rate calculation unit 21 may be read by the reference steering wheel angle calculation unit 22 and the FF correction gain calculation unit 24.

The reference steering wheel angle calculation unit 22 may calculate a reference steering wheel angle θho on the basis of the target yaw rate γtgt and the own vehicle speed V by referring to a reference steering wheel angle map and performing interpolation calculation. The reference steering wheel angle θho may be a reference value used when the own vehicle 1 is caused to travel along the middle of the traveling lane.

Figure 4:
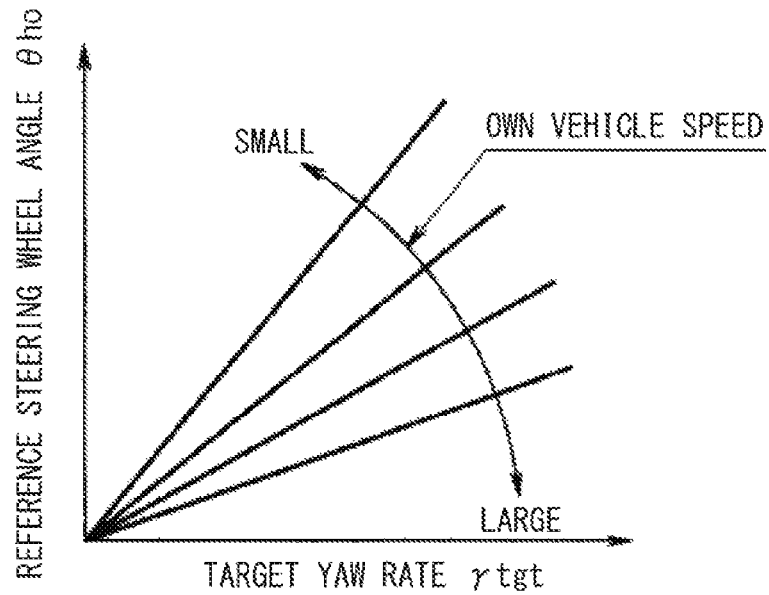
FIG. 4 is a conceptual diagram illustrating an example of a reference steering wheel angle map.

FIG. 4 is a conceptual diagram of the reference steering wheel angle map. As apparent from the relationship between the target yaw rate γtgt and the own vehicle speed V illustrated in FIG. 4, the reference steering wheel angle θho may be set to a larger value with an increase in the target yaw rate γtgt and a decrease in the own vehicle speed V. The reference steering wheel angle θho may be read by the FF target steering wheel angle calculation unit 26.

Alternatively, the reference steering wheel angle θho may be calculated by the following expression:

$$\theta ho = 1/(1 + As \times V^2) \times (L/V) \times \gamma tgt$$

where "L" denotes the wheel base of the own vehicle 1, and "As" denotes a stability factor inherent to vehicles. The stability factor As may be a fixed value preliminarily stored in a ROM, for example.

The estimated yaw rate calculation unit 23 may estimate the yaw rate generated when the own vehicle 1 travels on a curved road under the lateral force disturbance (e.g., a transverse gradient or a crosswind).

The estimated yaw rate calculation unit 23 may first calculate a lateral force component Y (see FIG. 5) exerted on the own vehicle 1 traveling on the curved road on the basis of the own vehicle speed V, the actual yaw rate γreal detected by the yaw rate sensor 13, and the lateral acceleration rate Ax detected by the lateral acceleration sensor 15, by using the following expression:

$$Y = m(\gamma_{real} \cdot V - A_x)$$

Note that the lateral acceleration rate Ax may include the centrifugal acceleration rate and the disturbance component generated at the time of traveling on the curved road.

Since the lateral acceleration rate Ax including the centrifugal acceleration rate and the disturbance component is generated while the own vehicle 1 is traveling on the curved road, the lateral acceleration rate Ax may be subtracted from the lateral acceleration rate determined on the basis of the actual yaw rate γreal and the own vehicle speed V to extract the lateral force component Y exerted on the own vehicle 1 due to the lateral force disturbance, as represented by Expression 3.

Thereafter, the estimated yaw rate calculation unit 23 may add the lateral force component Y to the right-hand side of Expression 1 described above to set a two-wheel model expression to be used when the own vehicle 1 travels on the curved road under the lateral force disturbance (e.g., a transverse gradient or a crosswind) as follows:

$$mV\frac{d}{dt}\beta + 2(K_f + K_r)\beta + \left\{mV + \frac{2}{V}(l_f K_f - l_r K_r)\right\}\gamma = 2K_f\delta + Y \quad \text{Expression 4}$$

$$2(l_f K_f - l_r K_r)\beta + I\frac{d}{dt}\gamma + \frac{2(l_f^2 K_f + l_r^2 K_r)}{V}\gamma = 2l_f K_f \delta \quad \text{Expression 5}$$

where "γ" denotes an estimated yaw rate γpres.

Expressions 4 and 5 may be subjected to the Laplace transform to calculate an estimated yaw rate γpres(s) as represented by the following expression.

$$\gamma_{pres}(s) = \frac{\begin{vmatrix} mVs + 2(K_f + K_r) & \frac{2K_f \delta + Y}{s} \\ 2(l_f K_f - l_r K_r) & \frac{2l_f K_f \delta}{s} \end{vmatrix}}{\begin{vmatrix} mVs + 2(K_f + K_f) & mV + \frac{2}{V}(l_f K_f - l_r K_r) \\ 2(l_f K_f - l_r K_r) & I_s mV + \frac{2}{V}(l_f^2 K_f - l_r^2 K_r) \end{vmatrix}} \quad \text{Expression 6}$$

The estimated yaw rate γpres in a steady state may be calculated using the final value theorem, as represented by the following expression:

$$\gamma_{pres} = \lim_{s \to 0} sr(s) = \frac{2K_f K_r I \delta V - YV(l_f K_f - l_r K_r)}{2K_f K_r I^2 - mV^2(l_f K_f - l_r K_r)} \quad \text{Expression 7}$$

Expression 7 may represent the steady state of the estimated yaw rate γpres of the own vehicle 1 generated when a steering operation is performed under the lateral force disturbance.

The estimated yaw rate γpres may be read by the FF correction gain calculation unit 24. The FF correction gain calculation unit 24 may calculate a FF correction gain Gcom on the basis of the ratio between the target yaw rate γtgt calculated by the target yaw rate calculation unit 21 and the estimated yaw rate γpres calculated by the estimated yaw rate calculation unit 23 using the following expression:

$$G_{com} = 1 - \frac{\gamma_{tgt}}{\gamma_{pres}}$$

The FF correction gain Gcom may be read by the FF target steering wheel angle calculation unit 26.

The condition determination unit 25 may determine whether conditions, such as driving conditions 1 to 3 described below, for applying the FF correction gain Gcom set by the FF correction gain calculation unit 24 are all satisfied.

The driving condition 1 may be a condition that the road curvature 1/R is a predetermined curvature (i.e., a threshold curvature) or greater. The driving condition 1 may be provided because a FF target steering wheel angle θhff needs to be determined in consideration of the lateral force disturbance only when the own vehicle 1 travels on a sharply curved road. The predetermined curvature (i.e., a threshold curvature) may thus be a value for determining whether the road curvature 1/R corresponds to a sharp curve.

The driving condition 2 may be a condition that the own vehicle speed V is a predetermined vehicle speed (i.e., a threshold vehicle speed) or higher. The driving condition 2 may be provided because the influence of the lateral force disturbance is small while the own vehicle 1 is traveling at a low speed, and the lateral force disturbance is sufficiently controlled by the feedback control. The predetermined vehicle speed (threshold) may thus be a value for determining whether the own vehicle speed V corresponds to a low speed.

The driving condition 3 may be a condition that a steering wheel angular speed wh is a predetermined angular speed or lower. The predetermined angular speed may be a constant value. The driving condition 3 may be provided to prevent the estimated yaw rate γpres from including a transient response component. Note that the steering wheel angular speed ωh may be calculated through the time derivative of the actual steering wheel angle detected by the steering wheel angle sensor 12.

If all the driving conditions 1 to 3 are satisfied, the condition determination unit 25 may determine that the conditions for applying the FF correction gain Gcom are satisfied, and set a condition determination flag F (F=1). If at least one of the driving conditions 1 to 3 is not satisfied, the condition determination unit 25 may determine that the conditions for applying the FF correction gain Gcom are not satisfied, and clear the condition determination flag (F=0).

The FF target steering wheel angle calculation unit 26 may read the reference steering wheel angle θho, the FF correction gain Gcom, and the value of the condition determination flag F. Thereafter, the FF target steering wheel angle calculation unit 26 may refer to the value of the condition determination flag F. If the value of the condition determination flag F is 1, the FF target steering wheel angle calculation unit 26 may read the FF correction gain Gcom set by the FF correction gain calculation unit 24. If the value of the condition determination flag F is 0, the FF target steering wheel angle calculation unit 26 may set the FF correction gain Gcom to 1 (Gcom=1).

Thereafter, the FF target steering wheel angle calculation unit 26 may correct the reference steering wheel angle θho with the FF correction gain Gcom (e.g., multiplying the reference steering wheel angle θho by the FF correction gain Gcom) to set the FF target steering wheel angle θhff (θho×Gcom=θhff). The FF correction gain Gcom may be determined in consideration of the lateral force disturbance directed to the inner side of the curved road. Therefore, multiplying the reference steering wheel angle θho by the FF correction gain Gcom may yield the FF target steering wheel angle θhff preliminarily including the factor of the lateral force disturbance. If the condition determination flag F is cleared (F=0), the FF correction gain Gcom may be set to 1. Thus, the reference steering wheel angle θho may be set as the FF target steering wheel angle θhff (θhff=θho).

The FB target steering wheel angle calculation unit 27 may calculate the position of the own vehicle 1 in the traveling direction after an elapse of a predetermined period of time (hereinafter simply referred to as a target position) on the basis of the actual steering wheel angle θh detected by the steering wheel angle sensor 12 and the own vehicle speed V. Thereafter, the FB target steering wheel angle calculation unit 27 may calculate a lateral position deviation Δc of the target position with respect to the road curvature of the target traveling course (e.g., the middle of the lane). The FB target steering wheel angle calculation unit 27 may then calculate a FB target steering wheel angle θhfb that causes the lateral position deviation Δc to become 0 (zero).

The instruction steering wheel angle calculation unit 28 may add the FF target steering wheel angle θhff of the feedforward control system to the FB target steering wheel angle θhfb of the feedback control system to determine an instruction steering wheel angle θhi (θhff+θhfb=θhi), and send the instruction steering wheel angle θhi to the EPS ECU 8.

The EPS ECU 8 may calculate an EPS additional torque Tep corresponding to the instruction steering wheel angle θhi (δ×N=θhi), and control driving of the EPS motor 7 using a drive signal corresponding to the EPS additional torque Tep. The EPS ECU 8 may thereby cause the own vehicle 1 to travel along the road curvature of the target traveling course (e.g., the middle of the lane).

According to the foregoing example embodiments of the technology, the lateral force disturbance, such as a transverse gradient or a crosswind, exerted on the own vehicle 1 traveling on a curved road under the automatic steering control is compensated by the feedforward control system. This reduces the loads on the feedback control system and suppresses a control delay. As a result, the drift phenomenon caused by the lateral force disturbance is effectively reduced, resulting in excellent running stability.

For example, the FF target steering wheel angle θhff is determined on the basis of the target yaw rate γtgt, which is used to cause the own vehicle 1 to travel along the horizontal curved road, and the lateral force component Y. This enables the feedforward control to reduce the drift phenomenon caused by the component of the lateral force disturbance while the own vehicle 1 is traveling on the curved road under the automatic steering control, and reduces the loads on the feedback control system. As a result, the control delay at the time of the automatic steering control is suppressed, achieving excellent running stability.

It should be understood that the technology should not be limited to the example embodiments described above. For example, the above-described driving conditions determined by the condition determination unit 25 are mere examples. Another driving condition regarding a road surface frictional coefficient (road surface μ) may be added.

One or more of the target yaw rate calculation unit 21, the reference steering wheel angle calculation unit 22, the feedforward target steering wheel angle calculation unit 26, the estimated yaw rate calculation unit 23, and the feedforward correction gain calculation unit 24 in the DSS ECU 11 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the target yaw rate calculation unit 21, the reference steering wheel angle calculation unit 22, the feedforward target steering wheel angle calculation unit 26, the estimated yaw rate calculation unit 23, and the feedforward correction gain calculation unit 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the target yaw rate calculation unit 21, the reference steering wheel angle calculation unit 22, the feedforward target steering wheel angle calculation unit 26, the estimated yaw rate calculation unit 23, and the feedforward correction gain calculation unit 24 in the DSS ECU 11 illustrated in FIG. 2.

The invention claimed is:

1. A vehicle drive assist apparatus to be applied to a vehicle, the vehicle drive assist apparatus comprising:
a target yaw rate calculation unit configured to set a target yaw rate on a basis of a road curvature of a target traveling course set in front of the vehicle and a vehicle speed of the vehicle, the target yaw rate being set to cause the vehicle to travel along a horizontal curved road;
a reference steering wheel angle calculation unit configured to set a reference steering wheel angle for a steering wheel of the vehicle on a basis of the target yaw rate set by the target yaw rate calculation unit and the vehicle speed;
a feedforward target steering wheel angle calculation unit configured to set a feedforward target steering wheel angle on a basis of the reference steering wheel angle set by the reference steering wheel angle calculation unit;
an estimated yaw rate calculation unit configured to calculate a lateral force component exerted on the vehicle traveling on a curved road on a basis of the vehicle speed, an actual yaw rate detected by a yaw rate sensor, and a lateral acceleration rate, and set an estimated yaw rate on a basis of the lateral force component and the target yaw rate set by the target yaw rate calculation unit; and
a feedforward correction gain calculation unit configured to set a feedforward correction gain on a basis of a ratio between the target yaw rate set by the target yaw rate calculation unit and the estimated yaw rate set by the estimated yaw rate calculation unit, wherein
the feedforward target steering wheel angle calculation unit is configured to set the feedforward target steering wheel angle in consideration of the lateral force component by correcting the reference steering wheel angle set by the reference steering wheel angle calculation unit with the feedforward correction gain set by the feedforward correction gain calculation unit.

2. The vehicle drive assist apparatus according to claim 1, further comprising
a condition determination unit configured to determine whether the feedforward correction gain set by the feedforward correction gain calculation unit is to be applied, wherein
in a case where the condition determination unit determines that a condition for applying the feedforward correction gain is not satisfied, the feedforward target steering wheel angle calculation unit is configured to set the reference steering wheel angle set by the reference steering wheel angle calculation unit as the feedforward target steering wheel angle.

3. The vehicle drive assist apparatus according to claim 2, wherein
the condition determined by the condition determination unit comprises the road curvature, the vehicle speed, and a steering wheel angular speed, and
in a case where the road curvature is a predetermined curvature or greater, where the vehicle speed is a predetermined vehicle speed or higher, and where the steering wheel angular speed is a predetermined angular speed or lower, the condition determination unit is configured to determine that the condition is satisfied.

4. The vehicle drive assist apparatus according to claim 1, further comprising:
a feedback target steering wheel angle calculation unit configured to calculate a target position of the vehicle in a traveling direction after an elapse of a predetermined period of time on a basis of an actual steering wheel angle detected by a steering wheel angle sensor and the vehicle speed, and set a feedback target steering wheel angle that causes a lateral position deviation of the target position with respect to the road curvature of the target traveling course to be zero; and
an instruction steering wheel angle calculation unit configured to set an instruction steering wheel angle by adding the feedforward target steering wheel angle set by the feedforward target steering wheel angle calculation unit to the feedback target steering wheel angle set by the feedback target steering wheel angle calculation unit, the instruction steering wheel angle being set to drive a steering system of the vehicle.

5. The vehicle drive assist apparatus according to claim 2, further comprising:
a feedback target steering wheel angle calculation unit configured to calculate a target position of the vehicle in a traveling direction after an elapse of a predetermined period of time on a basis of an actual steering wheel angle detected by a steering wheel angle sensor and the vehicle speed, and set a feedback target steering wheel angle that causes a lateral position deviation of the target position with respect to the road curvature of the target traveling course to be zero; and
an instruction steering wheel angle calculation unit configured to set an instruction steering wheel angle by adding the feedforward target steering wheel angle set by the feedforward target steering wheel angle calculation unit to the feedback target steering wheel angle set by the feedback target steering wheel angle calculation unit, the instruction steering wheel angle being set to drive a steering system of the vehicle.

6. The vehicle drive assist apparatus according to claim 3, further comprising:
a feedback target steering wheel angle calculation unit configured to calculate a target position of the vehicle in a traveling direction after an elapse of a predetermined period of time on a basis of an actual steering wheel angle detected by a steering wheel angle sensor and the vehicle speed, and set a feedback target steering wheel angle that causes a lateral position deviation of the target position with respect to the road curvature of the target traveling course to be zero; and
an instruction steering wheel angle calculation unit configured to set an instruction steering wheel angle by adding the feedforward target steering wheel angle set by the feedforward target steering wheel angle calculation unit to the feedback target steering wheel angle set by the feedback target steering wheel angle calculation unit, the instruction steering wheel angle being set to drive a steering system of the vehicle.

7. A vehicle drive assist apparatus to be applied to a vehicle, the vehicle drive assist apparatus comprising circuitry configured to
set a target yaw rate on a basis of a road curvature of a target traveling course set in front of the vehicle and a vehicle speed of the vehicle, the target yaw rate being set to cause the vehicle to travel along a horizontal curved road,
set a reference steering wheel angle for a steering wheel of the vehicle on a basis of the target yaw rate and the vehicle speed,
set a feedforward target steering wheel angle on a basis of the reference steering wheel angle,
calculate a lateral force component exerted on the vehicle traveling on a curved road on a basis of the vehicle speed, an actual yaw rate detected by a yaw rate sensor, and a lateral acceleration rate,
set an estimated yaw rate on a basis of the lateral force component and the target yaw rate, set a feedforward correction gain on a basis of a ratio between the target yaw rate and the estimated yaw rate, and set the feedforward target steering wheel angle in consideration of the lateral force component by correcting the reference steering wheel angle with the feedforward correction gain.

\* \* \* \* \*